United States Patent [19]

Hanneken et al.

[11] 4,242,782
[45] Jan. 6, 1981

[54] CERAMIC CONVEYOR ROLLS WITH METAL END CAPS FRICTIONALLY FIXED THERETO

[75] Inventors: Henry P. Hanneken, Pittsburgh; William H. Marriott, Jr., Altoona, both of Pa.

[73] Assignee: PPG Industries, Inc., Pittsburgh, Pa.

[21] Appl. No.: 46,984

[22] Filed: Jun. 8, 1979

[51] Int. Cl.$^3$ .................... B21B 31/08; F27D 3/00
[52] U.S. Cl. .......................... 29/129; 29/115; 64/30 D; 64/30 E; 432/236; 432/246
[58] Field of Search .......... 29/129, 129.5, 119, 29/115; 432/236, 246; 64/30 A, 30 C, 30 D, 30 E

[56] References Cited

U.S. PATENT DOCUMENTS

| | | | |
|---|---|---|---|
| 2,604,128 | 7/1952 | Dick et al. ................... | 29/129 UX |
| 3,080,735 | 3/1963 | Blom et al. .................. | 64/30 E |
| 3,116,053 | 12/1963 | Ericsson ...................... | 432/236 |
| 3,608,876 | 9/1971 | Leaich .......................... | 263/6 C |
| 3,867,748 | 2/1975 | Miller ............................ | 29/115 |
| 4,041,730 | 8/1977 | Kress ............................ | 64/30 D |
| 4,118,965 | 10/1978 | Grohoski ...................... | 29/129 |
| 4,131,420 | 12/1978 | Miller ............................ | 432/246 |
| 4,135,475 | 1/1979 | Bömers ........................ | 29/129 |
| 4,140,486 | 2/1979 | Nitschke ...................... | 432/246 |
| 4,150,622 | 4/1979 | Stollenwerk .................. | 29/129 |

*Primary Examiner*—James Kee Chi
*Attorney, Agent, or Firm*—Edward I Mates

[57] ABSTRACT

A ceramic roll for transporting glass sheets for thermal treatment is drivingly connected to a drive shaft through a metal end cap circumferentially grooved to receive a hard rubber O-ring that provides frictional engagement between the metal end cap and an end of the ceramic roll. The metal end cap is constructed and arranged to facilitate its mounting on and removal from the end of the ceramic roll.

8 Claims, 7 Drawing Figures

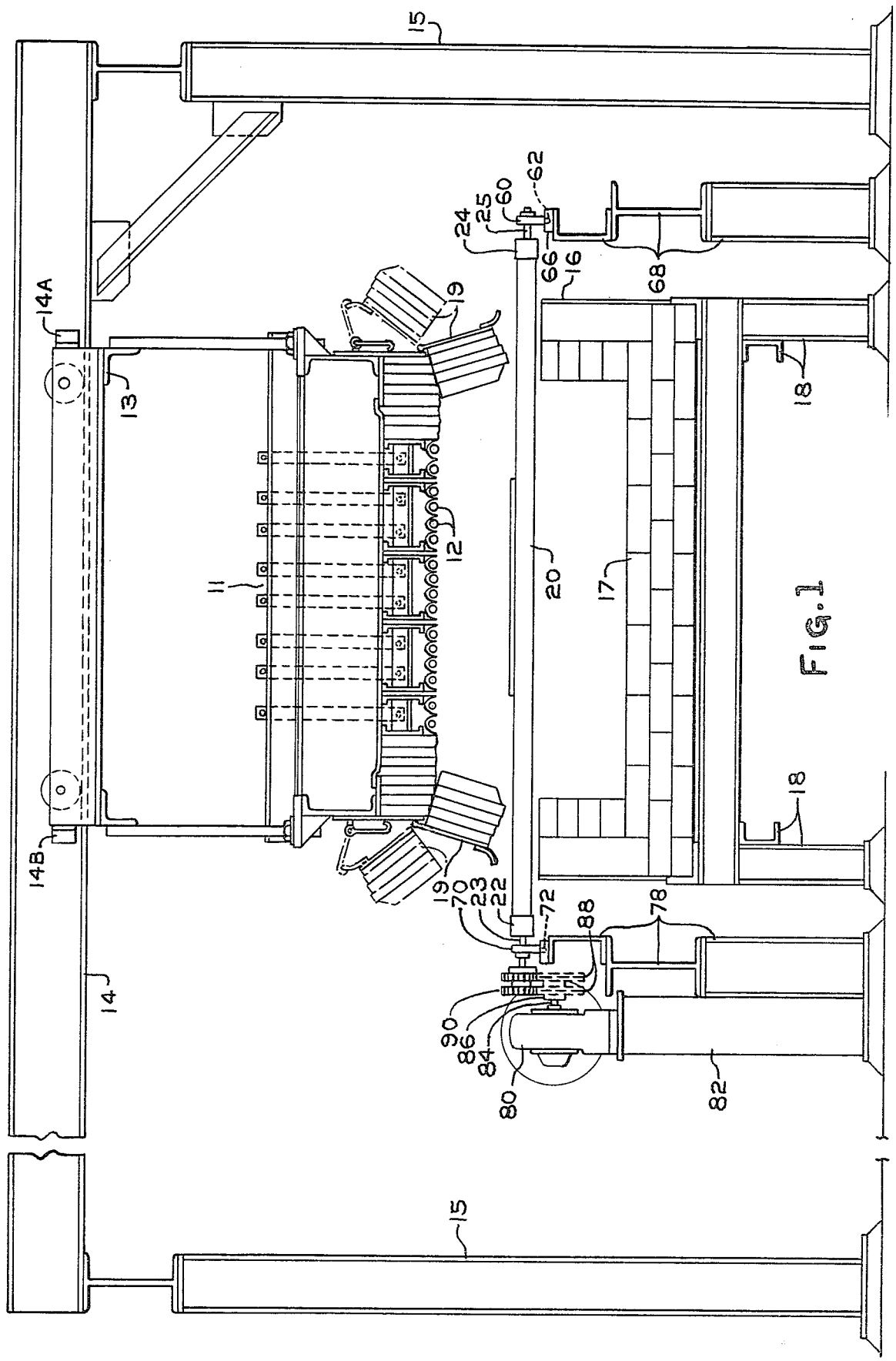

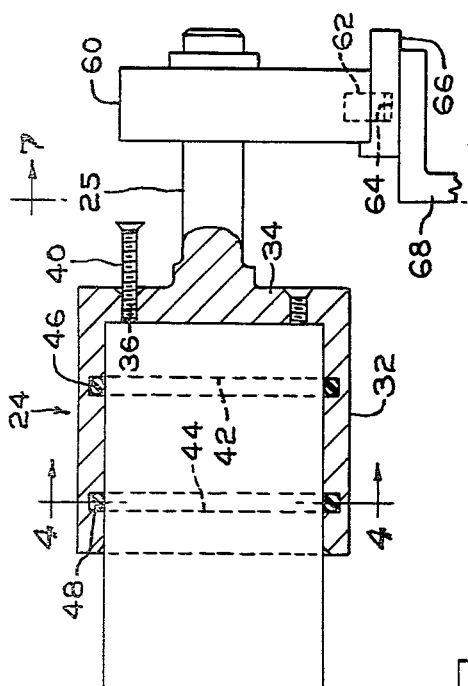
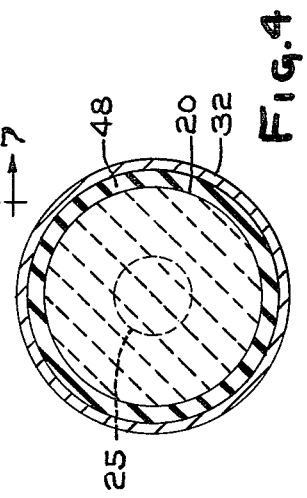
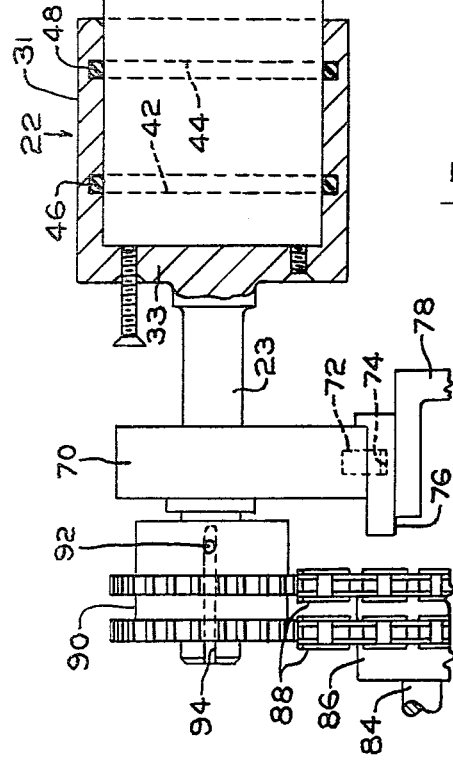
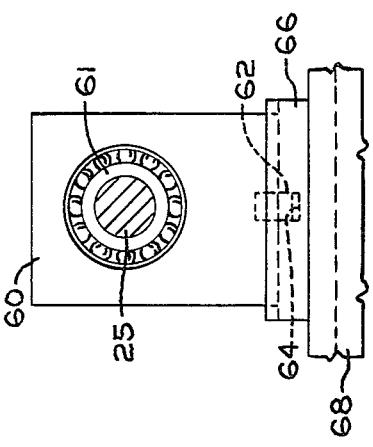
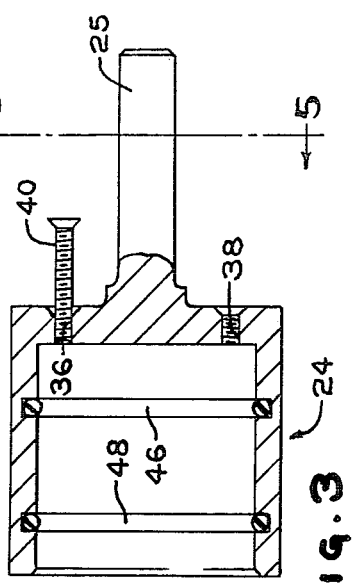
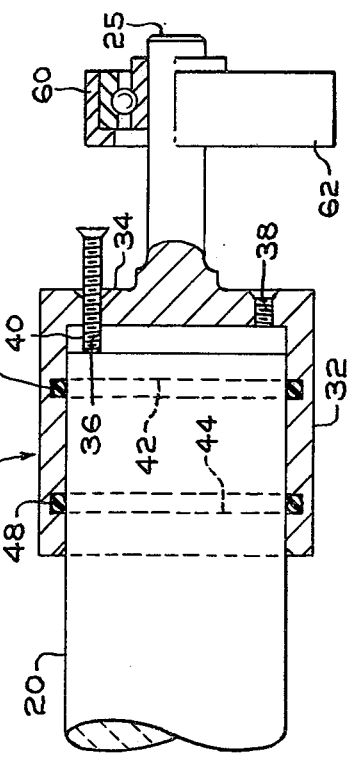
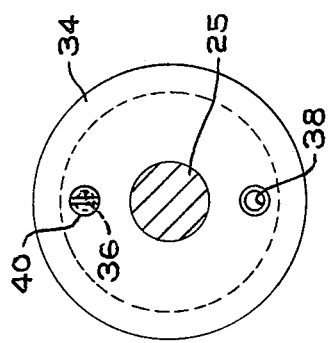

CERAMIC CONVEYOR ROLLS WITH METAL END CAPS FRICTIONALLY FIXED THERETO

BACKGROUND OF THE INVENTION

1. Field of the Invention

The present invention relates to frangible, ceramic conveyor rolls designed for use in the heat treatment of glass sheets wherein the rolls are rotated to transport a series of glass sheets through a hot enclosed atmosphere.

Furnaces for tempering or annealing glass conventionally include conveyors which carry glass sheets through an enclosed atmosphere of high temperature during the annealing or tempering of the glass. A so-called roller hearth-type of conveyor utilized to carry glass sheets includes horizontally extending conveyor rolls of ceramic material on which heated glass sheets are rotatably supported. Rotating the conveyor rolls drives the glass sheets by friction over the rolls through an enclosed furnace atmosphere of high temperature.

One ceramic material utilized to form cylindrically shaped rolls for a roller hearth is a sintered fused silica material that is made by grinding solid fused silica into small particles and then sintering these particles to each other at a temperature below the fusing temperature. Such a material is readily formed into an elongated shape required for the rolls of the roller hearth. In addition, fused silica rolls so formed have a relatively small coefficient of thermal expansion. This latter characteristic is extremely desirable due to extreme temperatures to which the rolls in the roller hearth are subjected during use.

One conventional way for rotatably supporting and driving conveyor rolls of fused silica and other ceramic compositions utilizes bearings that support the opposite end portions of the rolls in the roller hearth. A drive member having a toothed drive component such as a gear or a chain sprocket drives the roll at one end. A metallic end cap rotatable with a driven shaft is conventionally used to transmit the drive from the drive gear or chain sprocket to the end of the ceramic roll.

Rolls of ceramic composition are superior to metal rolls in high temperature environments for several reasons. First of all, ceramic rolls have a low coefficient of thermal expansion compared to that of metal rolls so that they are less likely to warp. Ceramic rolls are less likely to oxidize and flake off and develop pock marking in their glass engaging surface. However, ceramic materials are difficult to work and are quite frangible. Furthermore, such rolls composed of ceramic material cannot be connected directly to the drive mechanisms needed to rotate the rolls. The use of metal end caps with ceramic rolls for roller hearths has been developed to a certain extent. However, they have introduced problems of securing the metallic end caps to the ends of the ceramic rolls that they drive in transmitting a torque from the driving mechanism. One method involves an adhesive bond between the end cap and the end of the ceramic roll. Another method involves shrinking a metallic end cap onto the roll end by heat shrinking. Both of these methods have drawbacks. Adhesives presently known require an extended cure period of at least about 24 hours before the ceramic roll is securely fixed to its end cap. Such a delay is too long to accept for mass production operations.

Heat shrinking requires heating the metallic end cap to a very high temperature so that its diameter increases to enable it to be shrunk fit over the end of the ceramic roll. The internal diameter of the end cap and the outer diameter of the ceramic roll must be closely matched so that the end of the roll is small enough to be inserted into the heated end cap but large enough to be securely clamped after cooling. Often it is necessary to machine one or both of the matching parts in order to provide suitable matching. At the inner end of the metallic cap, the ceramic roll is subjected to a clamping pressure due to the heat shrinking of the end cap. Adjacent to this portion of the ceramic roll subjected to the clamping pressure is an adjacent portion free of the clamping pressure. At this location of the boundary between a high clamping pressure and no clamping pressure, ceramic rolls are subject to fracture due to the high stresses involved.

2. Description of the Prior Art

U.S. Pat. No. 3,608,876 to Leaich et al discloses pin and slot connections between ceramic hearth rollers and metal shafts. The fragility of ceramic rolls makes such pin and slot connections impractical.

U.S. Pat. No. 3,867,748 to Miller discloses the use of an adhesive for securing metal end caps to the ends of cylindrical ceramic conveying rollers in a roller hearth. The rolls cannot be used until the adhesive is cured. Since curing is a slow process, such rolls are not practical for rapid installation for high-speed production operations.

U.S. Pat. No. 4,131,420 to Miller utilizes a two-piece coupling that disconnects a ceramic roll including its end cap from a drive train which provides a rotating force to the end cap of the ceramic roll. The end cap in this patented apparatus is attached to the ceramic roll using an adhesive in a manner similar to that of the previous patent.

U.S. Pat. No. 4,140,486 to Nitschke utilizes a metallic spring end cap for rotatably driving a glass conveyor roll of ceramic material using helical spring coils that have a diameter in an undeflected condition slightly less than the diameter of the end of the ceramic roll so that coil deflection increasing the coil diameter allows mounting the coils over the end of the ceramic roll and a subsequent release clamps the coils over the end of the roll. The helical spring coil may be engaged by friction or by tooth sprocket or gear driven rolls to transmit a force thereto.

SUMMARY OF THE INVENTION

The present invention relates to a glass conveyor roll of ceramic composition having an axially elongated substantially cylindrical shape including an intermediate portion of round cross-section for conveying the glass sheets for thermal treatment that is connected to a metal shaft at each end. Each shaft is mounted for rotation with an end cap comprising a metal cylindrical member rotatable with said shaft and having an inner surface in circumferential engagement with the ceramic roll at one end portion thereof. According to the present invention, a circumferential groove extends around the inner surface of the metal cylindrical member and an O-ring of an elastomeric material such as natural or synthetic rubber is received within the groove in position to provide a frictional force sufficient to transmit a torque from said metal driving shaft through the metal cylindrical member to the ceramic roll without undue wear of the roll, the O-ring or the metal cylindrical member.

Means is provided to facilitate the mounting of the metal cylindrical member to an end of the ceramic roll. This is the provision of an apertured outer circular wall having at least one aperture to relieve pressure when the cylindrical member is fitted over the end portion of the ceramic roll. The absence of this aperture in the outer circular wall would cause pressure to be built up as the space between the flat end surface of the ceramic roll and the outer circular wall of the end cap is compressed when the metal cylindrical member is forced over the outer surface of the end portion of the ceramic roll.

In a specific embodiment of the present invention, the apertured outer circular wall of the end cap comprising the metal cylindrical member is provided with at least two apertures. One of the apertures provides an air passage and the other is adapted to receive an elongated threaded bolt to help separate the end cap including its cylindrical member and its apertured outer circular wall from the end portion of the ceramic roll. Preferably, the metal cylindrical member is provided with a pair of axially spaced circumferential grooves and an O-ring is received within each of said circumferential grooves.

The O-ring is preferably of an elastomeric material hard enough to withstand the force of torsion applied to the end cap which causes the ceramic roll to rotate with the driving shaft and soft enough to transmit the torsion drive by friction. A Shore durometer hardness of approximately 90 is preferred.

The features of the present invention are readily apparent from the description of a preferred embodiment which follows.

BRIEF DESCRIPTION OF THE DRAWINGS

In the drawings that form part of the specific embodiment of the present invention, FIG. 1 is a sectional view taken across a furnace provided with ceramic conveyor rolls having metal end caps secured thereto in a manner conforming to the present invention;

FIG. 2 is an enlarged, fragmentary view of an opposite pair of end caps showing how they are mounted to the ends of a ceramic roll with the central portion of the roll omitted in order to show the connections in as large a scale as possible;

FIG. 3 is a view of an empty end cap in cross-section showing O-rings applied thereto to prepare the end cap to be fitted over the end of a ceramic roll;

FIG. 4 is a cross-sectional view taken through an O-ring along line 4—4 of FIG. 2 showing how the metal end cap, the O-ring and the ceramic roll are interfitted to one another;

FIG. 5 is an end view of an end cap closed end wall seen along the line 5—5 of FIG. 3 showing a relief port and an internally threaded port adapted to receive an elongated screw which is shown partly inserted;

FIG. 6 is a view similar to FIG. 3 to the right-hand end of FIG. 2 showing said elongated screw in position to help separate the metal end cap from the end of the ceramic roll; and FIG. 7 is a fragmentary sectional view taken along the line 7—7 of FIG. 2.

DESCRIPTION OF THE PREFERRED EMBODIMENT

In order to understand the present invention, a brief description of a furnace containing ceramic rolls provided with metal end caps secured thereto in the manner of the present invention will be described. In FIG. 1, a cross-section view of a furnace is shown. The furnace comprises a plurality of furnace sections disposed in end-to-end relation. Each section has a roof portion 11 having electrical heaters 12 supported from an overhead carrier 13 that is movable transversely of the length of the furnace along overhead beams 14. Fixed stop members 14A and removable stop members 14B are provided on beams 14 to define an operating position for each roof portion 11 over the lower portion of the furnace. The beams extend transversely of the furnace length a sufficient transverse distance to enable one to move the roof portion 11 a transverse distance sufficient to clear the furnace. Vertical columns 15 are provided on each side of the furnace to support the opposite transverse ends of the beams 14. Reinforcing braces may also be included.

The furnace is also provided with a bottom portion including a pair of sidewalls 16 extending upward from a floor 17. The sidewalls 16 and floor 17 are of refractory material encased in a metal casing, which is supported above the floor of a building by a conventional metal support structure 18.

Along the length of the furnace a plurality of doors 19 of laminated insulating material are pivoted in transversely aligned pairs to the sides of the roof portion for pivoting relative to the lower end of the roof portion 11 between an open or raised position (depicted in phantom) that provides access to the furnace interior and a closed position in which the doors 19 hang downward from the bottom sides of the roof portion 11 to provide narrow elongated openings for the receipt of ceramic conveyor rolls 20 that extend across the width of the furnace. If needed, packing of insulating material may be stuffed into the openings between adjacent rolls to further enclose the space between the pivoted doors 19 and the upper ends of the side walls 16. The conveyor rolls are spaced from one another longitudinally of the furnace to provide longitudinally spaced rolling supports for transporting glass sheets through the length of the furnace. The length of the pivoted doors 19 is such as to expose a series of consecutive rolls when a single door on each side of the furnace is pivoted upward and hooked to the roof portion to permit access to the interior of the furnace without requiring lateral displacement of the roof portion 11.

Each ceramic conveyor roll 20 is provided with a metal end cap 22 at its driving end thereof and an additional metal end cap 24 at its end opposite the driving side. A drive shaft 23 is connected to and extends axially outward from the central portion of the metal end cap 22 and an additional shaft 25 is connected to and extends outwardly from the metal end cap 24. The specific construction that drivingly connects the drive shaft 23 to a drive motor 80 and that provides bearing support for shafts 23 and 25 will be described later.

The conveyor rolls of the present invention are provided with cylindrically shaped fused silica rolls 20 extending throughout the entire width of the furnace through horizontally aligned openings between the closed doors 19 and the upper ends of the side walls 16 and through any insulating packing that may be included to improve the manner in which the end caps are insulated from the furnace heat.

The gist of the present invention involves the specific construction of the metal end caps 22 and 24 and the manner in which they are mounted in frictional engagement around the opposite ends of their associated ceramic conveyor roll 20.

Each end cap 22 and 24 comprises a metal cylindrical member 31 or 32, respectively rotatable with either the driving shaft 23 or the additional shaft 25. The shafts 23 and 25 extend in opposite directions axially outward from the center portion of a respective outer, apertured, circular wall member 33 or 34 which forms a head for the metal end cap 22 or 24. Each of the apertured circular wall members 33 and 34 is provided with a pair of apertures 36 and 38. The apertures are internally threaded for receipt of an elongated bolt 40 and for an additional bolt, if desired.

Each metal cylindrical member 31 or 32 has a pair of circumferential grooves 42 and 44 extending around the inner surface thereof. An outer O-ring 46 is received in outer circumferential groove 42, and an inner O-ring 48 is received within an inner circumferential groove 44. The O-rings are identical to one another as are the circumferential grooves formed in the inner surface of the cylindrical members 31 and 32.

The relative size of the O-rings compared to the width and depth of the circumferential grooves 42 and 44 is such that the O-rings are capable of providing a frictional coupling between the respective metal end caps 22 and 24 and the opposite ends of the associated ceramic roll 20. In a preferred embodiment of the present invention employing ceramic rolls having a diameter of 2 inches, the inner surface of the metal cylindrical members are provided with a bore of 2.001 inches to be concentric to the driving shaft 23 or the other shaft 25. The circumferential grooves have an outer diameter of 2.240 inches and the O-rings are formed of rubber having a hardness of 90 on the Shore durometer scale and have a nominal size of 2¼ inch outer diameter and 2 inch inner diameter. The grooves are 5/32 inch wide and the O-rings are capable of distortion when the metal end caps 22 and 24 are applied over the opposite ends of the ceramic roll 20.

When an end cap 22 or 24 is forced over an end of the ceramic roll, both apertures 36 and 38 in the outer circular apertured wall member 33 or 34 are open to enable air to escape as the metal end cap is fitted over the end of the ceramic roll. Once the two end caps are fitted securely, a bolt may be threaded into the aperture 36 with its inner end not extending beyond the inner surface of member 33 or 34, and another bolt of the apertured wall of member 33 or 34 threaded similarly into the aperture 38. Inserting bolts within the threaded apertures 36 and 38 avoids the entry of dirt into the space between the ends of the ceramic roll 20 and the metal end caps 22 and 24.

Once the metal end caps are secured to the opposite ends of the ceramic rolls along the length of a furnace, the apparatus is ready to go. There is no need to wait for an adhesive to cure before the apparatus is ready to convey glass sheets through the furnace.

Even though the temperature of the glass within the furnace may obtain elevated temperatures on the order of 1200° F. and higher and the internal temperature within the furnace may even be higher, the temperature attained by the O-rings within the end caps and outside the furnace side walls 16 is never greater than a temperature that the O-rings can withstand. The insulation afforded by the side walls 16, the doors 19 and the insulation packing around the rolls provides sufficient thermal insulation to prevent the O-rings from heating to a temperature at which they are likely to deteriorate due to heat.

Whenever it is necessary for the metal end cap to be separated from the ceramic roll, an elongated bolt 40 is used to replace a shorter bolt and when its inner end protrudes beyond the inner surface of wall members 33 or 34, it forces the end cap away from the end portion of the ceramic roll 20 by abutting against the end surface thereof. Metal end cap 22 may be removed because the shaft 23 will move away with the metal end cap 22 when the elongated bolt 40 is extended. Once the end of the ceramic roll 20 is separated from the outer apertured circular wall member 34, it is easy to disconnect the metal end caps.

A bearing housing 60 is provided with a bearing 61 to receive the shaft 25. An alignment pin 62 extends downward from the housing 60 to fit into a receiving hole 64 provided at a proper location along the length of a horizontal alignment member 66. The horizontal alignment member 66 is located below the bearing housing 60 and the upper surface of a bearing support structure 68. The drive shaft 23 extends through and beyond a bearing housing 70 provided with an alignment pin 72 that is received in a pin-receiving hole 74 of a horizontal alignment member 76 that is supported on a bearing support structure 78 in a manner similar to the support provided on the other side of the furnace by the bearing housing 60, its alignment pin 62, and its associated pin-receiving hole 64 in its respective alignment member 66 supported on the bearing support structure 68.

The drive for rotating a plurality of ceramic rolls 20 in unison is provided by a drive motor 80 resting on a drive motor support 82 (FIG. 1). The motor 80 drives a main drive shaft 84 and a lower double sprocket 86 fixed to the main drive shaft 84 for rotation therewith. The lower double drive sprocket 86 drives a continuous chain 88, upon which is superimposed an upper double sprocket 90 fixed to the outer end of the drive shaft 23. Thus, the drive motor 80 drives a plurality of drive shafts 23 in unison. A key 92 is fixed to drive shaft 23 for engagement with a keyway 94 on the housing for the double sprocket 90 to permit thermal expansion of the conveyor roll and avoid binding.

Whenever it is necessary to remove a ceramic roll from the furnace, the doors 19 that are laterally opposite from one another can be pivoted into an open position where they may be temporarily supported through hooks and the roll together with its associated end caps 22 and 24, shafts 23 and 25, double sprockets 90 and the bearing housing 60 and 70 with their alignment pins 62 and 72 can be lifted from the pin-receiving holes 64 and 74, thereby removing the roll from the furnace very readily. Another ceramic roll with its metal end caps 22 and 24, shafts 23 and 25, bearing housing 60 and 70, alignment pins 62 and 72, and the double sprockets 90 can readily replace the one that was removed. The doors 19 are unhooked to pivot into their lower positions, packing is applied and the furnace can continue its operation with a minimum of down time.

The form of the invention shown and described in this disclosure represents an illustrative preferred embodiment thereof. It is understood that various changes may be made without departing from the gist of the invention as defined in the claimed subject matter that follows.

We claim:

1. A glass conveyor roll of ceramic composition having an axially elongated, substantially cylindrical shape including an intermediate portion of round cross-section for conveying glass sheets for thermal treatment, shafts located in alignment with the ends of said roll, and means for drivingly connecting at least one of said shafts to said roll, said means comprising a metal end cap including a metal cylindrical member rotatable with one of said shafts and having an inner surface in circumferential engagement with said roll at an end portion thereof, a circumferential groove in said inner surface of said metal cylindrical member and an O-ring of elastomeric material received within said groove in position to provide a frictional force sufficient to transmit a torque from said one of said shafts through said metal cylindrical member to said ceramic roll without undue wear of said roll, O-ring or said metal cylindrical member.

2. A roll as in claim 1, wherein said metal cylindrical member is provided with an apertured outer wall member whose central portion is fixed to the inner end of said shaft, said wall member having at least one aperture radially spaced from the inner end of said shaft to relieve pressure when said cylindrical member is fitted over the end portion of said ceramic roll.

3. A roll as in claim 2, wherein said apertured outer wall member is provided with at least two apertures, both radially spaced from said shaft.

4. A roll as in claim 3, wherein at least one of said apertures is internally threaded to receive an elongated threaded bolt to help separate said cylindrical member from said end portion of said ceramic roll.

5. A roll as in claim 1, wherein said metal cylindrical member is provided with a pair of axially spaced circumferential grooves and an O-ring is received within each of said circumferential grooves.

6. A roll as in claim 1, wherein said shafts are rotatably supported in bearing housings supported laterally outside opposite side walls of a tunnel-type furnace having pivoted access doors disposed along the length thereof, so that said conveyor roll extends between said bearing housings across the width of said furnace and beyond the side walls thereof, each said bearing housing having an alignment pin extending downward therefrom, a horizontal alignment member for supporting each of said bearing housings, a pin-receiving hole in each said horizontal alignment member, and separable driving means fixed to the outer end of one of said shafts, whereby when said alignment pins are in said pin-receiving holes said roll is properly positioned across the width of said furnace and in driving engagement to said shaft driving means, and said roll may be readily removed from said furnace by pivoting a pair of transversely spaced access doors and removing said alignment pins from said pin-receiving holes.

7. A roll as in claim 1 or claim 5, wherein each said O-ring is composed of rubber.

8. A roll as in claim 7, wherein said rubber has a Shore durometer of approximately 90.

* * * * *